(12) United States Patent
Huang et al.

(10) Patent No.: US 10,358,055 B2
(45) Date of Patent: Jul. 23, 2019

(54) ANGLE ADJUSTING DEVICE AND SEAT HAVING THE SAME

(71) Applicant: HUBEI AVIATION PRECISION MACHINERY TECHNOLOGY CO., LTD., Xiangyang, Hubei (CN)

(72) Inventors: Zhengkun Huang, Hubei (CN); Xianhu Luo, Hubei (CN); Shuangqiang Li, Hubei (CN)

(73) Assignee: HUBEI AVIATION PRECISION MACHINERY TECHNOLOGY CO., LTD., Xiangyang, Hubei (CN)

( * ) Notice: Subject to any disclaimer, the term of this patent is extended or adjusted under 35 U.S.C. 154(b) by 165 days.

(21) Appl. No.: 15/663,372

(22) Filed: Jul. 28, 2017

(65) Prior Publication Data

US 2018/0072194 A1 Mar. 15, 2018

(30) Foreign Application Priority Data

Sep. 9, 2016 (CN) .......................... 2016 1 0812769
Sep. 9, 2016 (CN) ...................... 2016 2 1047353 U

(51) Int. Cl.
*B60N 2/22* (2006.01)
*B60N 2/235* (2006.01)

(52) U.S. Cl.
CPC ........... *B60N 2/2356* (2013.01); *B60N 2/224* (2013.01); *B60N 2/236* (2015.04)

(58) Field of Classification Search
CPC ...... B60N 2/2356; B60N 2/236; B60N 2/224; B60N 2/504; B60N 2002/948; A47C 7/35; A47C 7/14; A47C 7/4621; A47C 7/441

(Continued)

(56) References Cited

U.S. PATENT DOCUMENTS 8,985,689 B2 * 3/2015 McCulloch ............ A47C 1/026
 297/367 P
9,527,410 B2 * 12/2016 Leconte ............... B60N 2/2252
(Continued)

FOREIGN PATENT DOCUMENTS

| DE | 20 2008 008 090 U1 | 10/2008 |
| EP | 2995498 A1 | 3/2016 |
| KR | 10-2016-0031444 A | 3/2016 |

OTHER PUBLICATIONS

Extended European Search Report from European Application No. 17183269.4, dated Jan. 30, 2018 (8 pages).

*Primary Examiner* — Milton Nelson, Jr.
(74) *Attorney, Agent, or Firm* — Merchant & Gould P.C.

(57) ABSTRACT

An angle adjusting device is provided, which includes a ratchet, multiple sliders, an expansion and retraction mechanism, and a sliding groove plate. The ratchet is provided with n inner teeth; and m slider groups consisting of the multiple sliders include one base slider group and m−1 deflecting slider groups, where the outer teeth of the deflecting slider groups have an angular deflection about a central shaft of the ratchet with respect to the outer teeth of the base slider group, and the angular deflection is (Z+k/m)360/n degrees, and $1 \leq k \leq m-1$, and the expansion and retraction mechanism is capable of simultaneously push the multiple sliders to extend in radial directions. The outer teeth of different sliders can simultaneously abut against or be engaged with the inner teeth at different phases, thus achieving the stable securing and stepless adjusting of the ratchet position.

20 Claims, 15 Drawing Sheets

(58) Field of Classification Search
USPC .............................. 297/367 P, 367 R; 16/327
See application file for complete search history.

(56) References Cited

U.S. PATENT DOCUMENTS

| | | |
|---|---|---|
| 9,731,633 B2 * | 8/2017 | Veine ..................... B60N 2/235 |
| 9,878,641 B2 * | 1/2018 | Gallienne ................ B60N 2/20 |
| 2016/0075261 A1 | 3/2016 | Gallienne et al. |

* cited by examiner

ANGLE ADJUSTING DEVICE AND SEAT HAVING THE SAME

CROSS-REFERENCE TO RELATED APPLICATION

The present application claims the priorities to Chinese patent application No. 201610812769.2 titled "ANGLE ADJUSTING DEVICE AND SEAT HAVING THE SAME", filed with the Chinese State Intellectual Property Office on Sep. 9, 2016 and Chinese patent application No. 201621047353.8 titled "ANGLE ADJUSTING DEVICE AND SEAT HAVING THE SAME", filed with the Chinese State Intellectual Property Office on Sep. 9, 2016, the entire disclosures of which are incorporated herein by reference.

FIELD

This application relates to the technical field of mechanical design, and more particularly to an angle adjusting device. In addition, the present application further relates to a seat having the angle adjusting device.

BACKGROUND

In order to meet different requirements of users, an included angle of a seat between a backrest and a seat bottom can be adjusted in the using process, which can improve the comfort of the seat. This technology is common in vehicle and operation machinery.

With the development of the machinery industry, higher requirements are imposed on the precision of seat angle adjustment of a seat angle adjusting device.

In the conventional technology, a seat angle adjusting device generally includes: a ratchet having inner teeth and fixedly connected to a backrest; a sliding groove plate having a sliding groove fixedly connected to a seat basin; multiple sliders having teeth and arranged on the sliding groove plate; a cam controlling a radial movement of the multiple sliders; and a return spring for moving the multiple sliders radially outwards. In this solution, all the sliders remain in the same phase such that the teeth of all the sliders and the teeth of the ratchet are in a full engagement state or are in a non-engagement state, and the minimum adjustment unit of such an angle adjusting device is a pitch, therefore, the adjustment precision is low. In another technique, multiple slider groups having phase differences are provided. One slider group is selected to engage with the ratchet to improve the adjustment precision in use, however, the adjustment precision directly depends on the number of the slider groups provided, and it achieves the precision improvement completely by increasing the number of sliders, which increases the cost of the device and the weight of the angle adjusting device, and achieves a very limited adjustment precision.

In summary, a technical issue to be addressed presently by those skilled in the art is to provide a high-precision angle adjusting device.

SUMMARY

In view of the above, an angle adjusting device with high adjustment precision is provided by the present application, which can achieve stepless angle adjustment.

A seat having the angle adjusting device is further provided by the present application.

The present application provides the following technical solutions.

An angle adjusting device, includes a ratchet having an inner ring provided with inner teeth, multiple sliders each provided with outer teeth, an expansion and retraction mechanism, and a sliding groove plate arranged coaxially with the ratchet and rotatable with respect to the ratchet, wherein the expansion and retraction mechanism is configured to control the multiple sliders to move radially along the sliding groove plate, so as to allow the outer teeth to engage with or disengage from the inner teeth, and the expansion and retraction mechanism is configured to lock or unlock the multiple sliders, the ratchet is provided with n inner teeth;

the multiple sliders form m slider groups, which include one base slider group and m−1 deflecting slider groups, specifically, the outer teeth of each of the deflecting slider groups has an angular deflection about a central shaft of the ratchet with respect to the outer teeth of the base slider group, and the angular deflection is $(Z+k/m)360/n$ degrees, where Z, m, n and k are all integers, and $1 \leq k \leq m-1$, and k is different for each of the deflecting slider groups in calculating the angular deflection; and the expansion and retraction mechanism is configured to simultaneously push the multiple sliders to extend in radial directions such that the outer teeth of the multiple sliders abut against or are engaged with the inner teeth, and the multiple sliders are locked.

Preferably, the expansion and retraction mechanism includes:

a flange provided on the sliding groove plate;

multiple wedges each arranged radially between the flange and a corresponding slider, and multiple elastic members each arranged between the sliding groove plate and a corresponding wedge, wherein the multiple elastic members enables the multiple wedges to move in directions for pushing the multiple sliders to move radially outwards; the multiple wedges and the multiple sliders have one-to-one correspondence, the multiple wedges abut against the flange in a circumferential direction via the multiple elastic members, and the multiple wedges and the multiple elastic members have one-to-one correspondence; contact surfaces of the multiple wedges in contact with the multiple sliders and contact surfaces of the multiple wedges in contact with the multiple elastic members are both self-locking surfaces, in the process of a contact state of the teeth of the slider and the teeth of the ratchet switching from an opposed state to a full engagement state, the pushing effect of the elastic members enables the self-locking surfaces to be in a self-locking state, and when the multiple wedges are moved in directions against elastic forces of the multiple elastic members, the multiple wedges can drive the multiple sliders to retract radially; and an unlocking member configured to push the multiple wedges to release self-locking and drive the slider to retract radially, so as to separate the inner teeth from the outer teeth.

Preferably, each of the multiple sliders is provided with an axial slider boss, each of the multiple wedges is provided with an axial wedge boss; the unlocking member is coaxially arranged with the sliding groove plate, the unlocking member is provided with multiple slider control grooves each in cooperation with the slider boss and multiple wedge control grooves each in cooperation with the wedge boss, and the rotation of the unlocking member in an unlocking direction allows the multiple wedges to move in directions against the elastic forces of the multiple elastic members and allows the multiple sliders to retract radially.

Preferably, the number of sliders of the base slider group is equal to the number of sliders of each of the deflecting slider groups, and the slider groups are arranged alternately in the circumferential direction, and circumferentially adjacent sliders belong to different slider groups.

Preferably, when the number of the slider groups m is greater than or equal to 5, the outer teeth of two circumferentially adjacent slider groups have an adjacent angular deflection about the central axis of the ratchet, and the adjacent angular deflection is $(Z_1+k/m)360/n$ degrees, where $Z_1$ is an integer, m is the number of the slider groups, n is the number of inner teeth, and m, n and k are all integers, and $2 \leq k \leq m-2$.

Preferably, when m≥5, the adjacent angular deflection of the outer teeth of the two circumferentially adjacent slider groups is $(Z_1+k/m)360/n$ degrees, where $Z_1$ is an integer, m is the number of the slider groups, n is the number of the inner teeth, and m and n are all integers, and k is equal to 2 or 3; and/or the outer teeth of the two circumferentially alternate slider groups have an alternate angular deflection about the central axis, and the alternate angular deflection is $(Z_2+k/m)360/n$, $Z_2$ is an integer, m is the number of the slider groups, n is the number of the inner teeth, m and n are all integers, and k=1 or 2.

Preferably, each of the slider groups includes a sliders, and the two circumferentially adjacent sliders are spaced apart in the circumferential direction by an angle ranging from 360/ma−10 degrees to 360/ma+10 degrees.

Preferably, in the case that the number of the slider groups m=2, each of the slider groups includes two sliders; and in the case that the number of the slider groups m=3, each of the slider groups includes two to three sliders; and in the case that m≥4, each of the slider groups includes one slider.

Preferably, the contact strength between the inner teeth and the outer teeth is greater than the contact strength between multiple radial sliding grooves of the sliding groove plate and the multiple sliders.

A seat includes a seat back, a seat basin and an angle adjusting device configured to adjust a relative angle between the seat back and the seat basin. The angle adjusting device is the angle adjusting device according to any one of the above aspects.

In the angle adjusting device according to the present application, the angular deflection enables each of the multiple slider groups to have different states of engagement with the ratchet, and each of the slider groups evenly divides the degree of one inner tooth into m parts, thereby forming m phases, and different slider groups are arranged correspondingly to the inner teeth at different phases, which allows the outer teeth of different sliders to be engaged with the inner teeth at different phases when the multiple sliders extend outwards. In the case that the multiple sliders are extended outwards and engaged, there may be one slider group whose outer teeth are fully engaged with the inner teeth, and other slider groups whose outer teeth are engaged with the inner teeth leftward and rightward such that the ratchet cannot rotate clockwise or counterclockwise, thus achieving the securing of the ratchet. In another possible implementation, in the case that the outer teeth of the multiple slider groups are engaged with the inner teeth leftward and/or rightward, securing the ratchet is achieved as well.

In the case that both the leftward engagement and the rightward engagement present simultaneously in the multiple sliders, the ratchet cannot be rotated in a clockwise and counterclockwise direction and the slider guide surfaces can be brought into close contact with the sliding groove guide surfaces on the sliding grooves, and the gap of the ratchet can be eliminated, thereby achieving stable securing of the ratchet.

In summary, the outer teeth of different slider groups can abut against or be engaged with the inner teeth in a full engagement state, a half engagement state and an opposed state, and the sliders can be engaged with the ratchet regardless of whether the ratchet is rotated to any angle. In the full stroke range in which the inner teeth are engaged with the outer teeth, the expansion and retraction mechanism can push the sliders to extend simultaneously in radial directions and can lock the positions of the multiple sliders, such that the sliders cannot be retracted by the pressure of the ratchet, so as to achieve the securing of the ratchet, and finally realize angle stepless adjustment of the ratchet.

A seat including the above-described angle adjusting device is further provided according to the present application, the angle adjusting device includes a seat back, a seat basin and an angle adjusting device, which realizes angle stepless adjustment to the seat back.

BRIEF DESCRIPTION OF THE DRAWINGS

For more clearly illustrating embodiments of the present application or the technical solutions in the conventional technology, drawings referred to describe the embodiments or the conventional technology will be briefly described hereinafter. Apparently, the drawings in the following description are only several embodiments of the present application, and for the person skilled in the art, other drawings may be obtained based on the provided drawings without any creative efforts.

Names of components in FIGS. 1 to 17 are as follows:

| 1 | sheath, | 2 | ratchet, |
|---|---|---|---|
| 21 | ratchet outer ring, | 22 | inner teeth, |
| 3 | unlocking cam, | 31 | slider control groove, |
| 32 | non-circular hole, | 33 | wedge control groove, |
| 4 | slider, | 41 | slider boss, |
| 42 | outer teeth, | 43 | slider self-locking surface, |
| 44 | slider guide surface, | 5 | elastic member, |
| 6 | wedge, | 61 | wedge self-locking surface, |
| 62 | wedge rotation surface, | 63 | wedge groove, |
| 64 | wedge boss, | 7 | central shaft, |
| 71 | flat step, | 8 | sliding groove plate, |
| 81 | sliding groove plate inner ring, | 82 | sliding groove, |
| 83 | fan-shaped flat boss, | 84 | flange, |
| 85 | elastic member fixing groove, | 86 | fan-shaped boss stressed surface. |

Names of components in FIGS. 4 to 13 are as follows: A slider A, B slider B, C slider C, D slider D, E slider E.

DETAILED DESCRIPTION

Technical solutions in embodiments of the present application will be clearly and fully described below in conjunction with the accompanying drawings in the embodiments of the present application. Apparently, the described embodiments are only a part, but not all, of the embodiments of the present application. All other embodiments obtained by the ordinary person skilled in the art based on the embodiments of the present application without any creative efforts fall within the protection scope of the present application.

An angle adjusting device is provided by the present application, which has high adjustment precision and can achieve stepless angle adjustment. A seat including the angle adjusting device is further provided by the present application.

Figure 1:
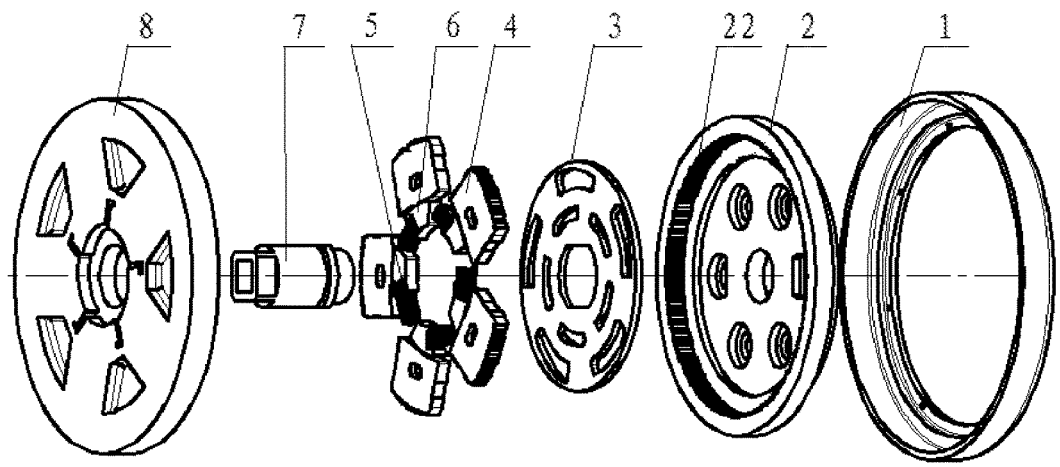
FIG. 1 is a schematic exploded view of an embodiment of an angle adjusting device according to the present application.
Figure 2:
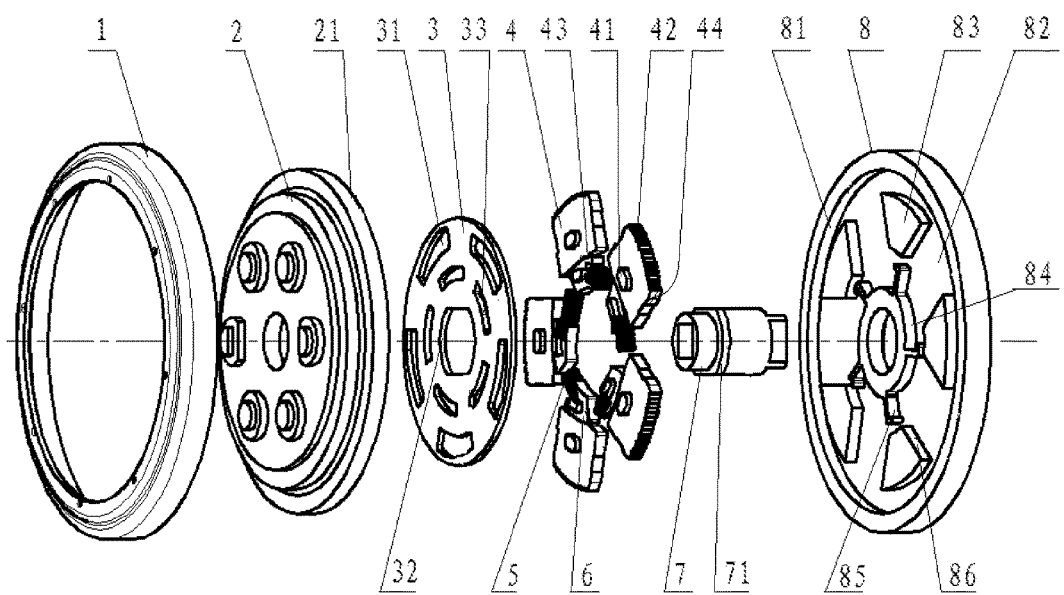
FIG. 2 is a schematic rear exploded view of the embodiment of the angle adjusting device according to the present application.
Figure 3:
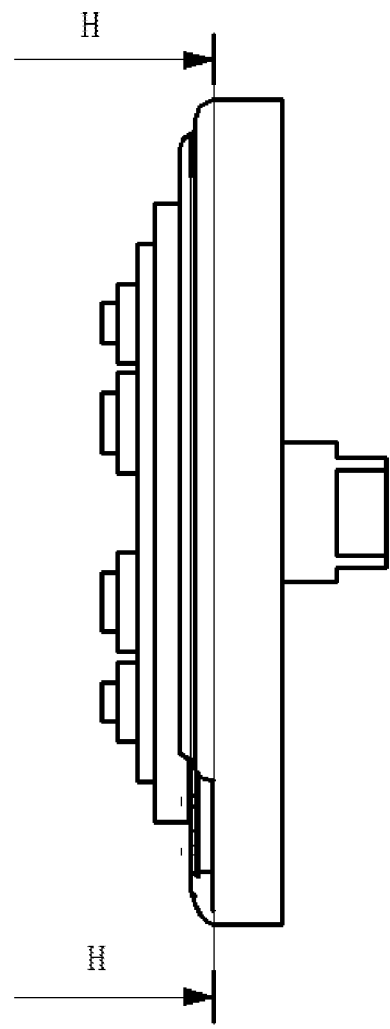
FIG. 3 is a schematic view showing the structure of the embodiment of the angle adjusting device according to the present application.
Figure 4:
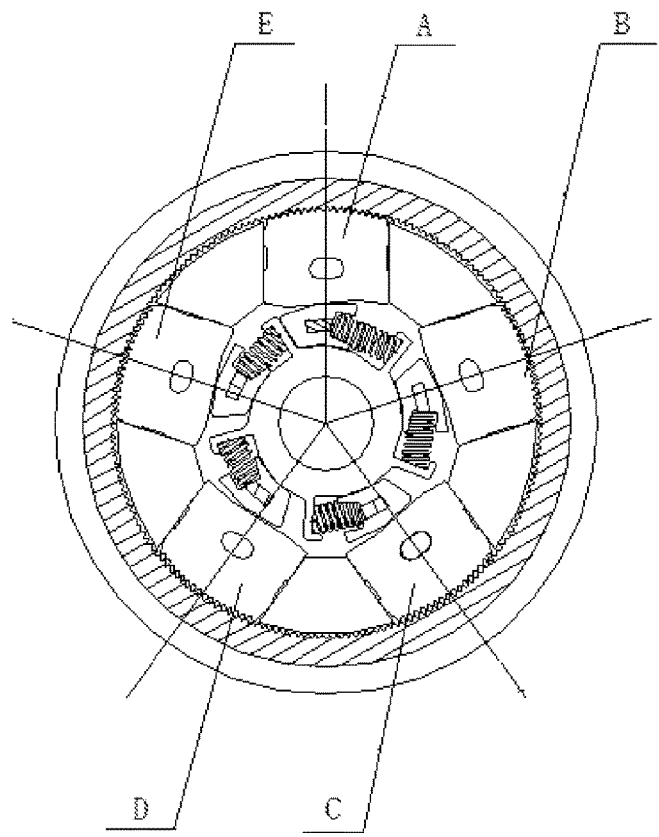
FIG. 4 is a sectional view taken along a direction H-H in FIG. 3.
Figure 5A:
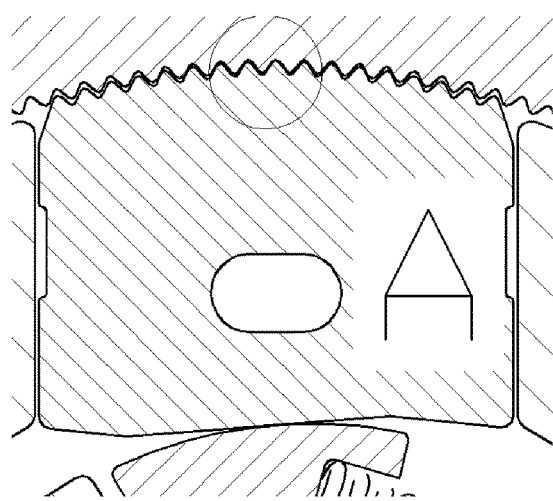
FIG. 5*a* is a schematic partial view of a slider A in FIG. 4.
Figure 5B:
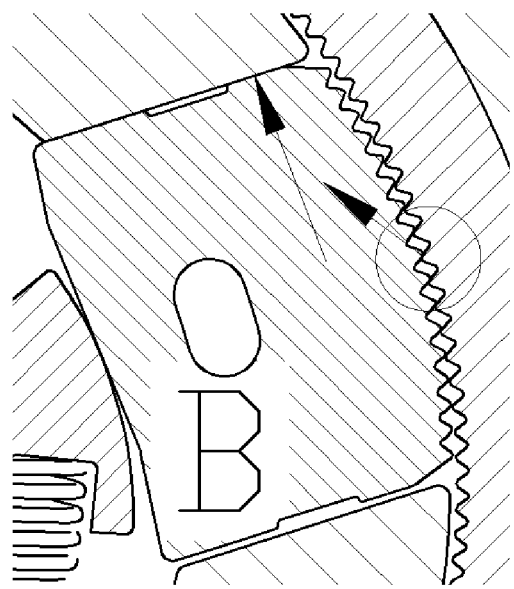
FIG. 5*b* is a schematic partial view of a slider B in FIG. 4.
Figure 5C:
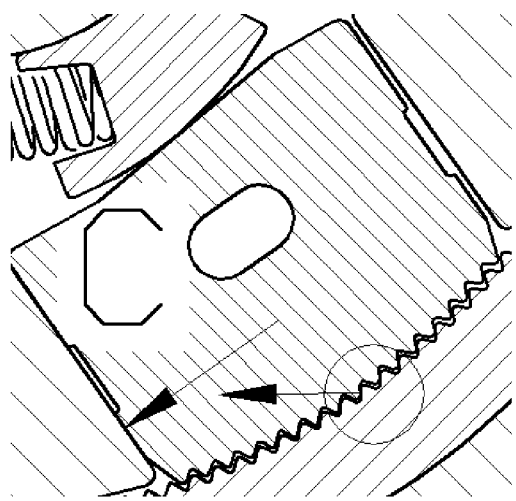
FIG. 5*c* is a schematic partial view of a slider C in FIG. 4.
Figure 5D:
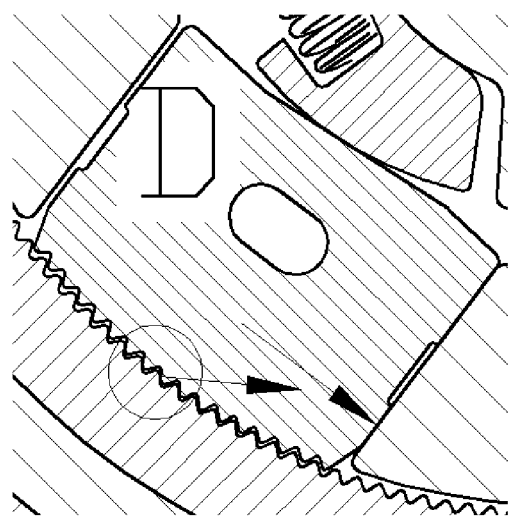
FIG. 5*d* is a schematic partial view of a slider D in FIG. 4.
Figure 5E:
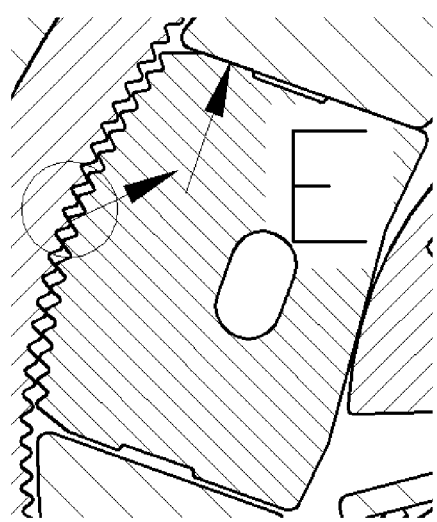
FIG. 5*e* is a schematic partial view of a slider E in FIG. 4.

Reference is made to FIGS. 1 to 17. FIGS. 1 to 3 are exploded views and a structural view of the angle adjusting device according to the present application. FIG. 4 and FIGS. 5a to 5e are a sectional view taken along a direction H-H of FIG. 3 and schematic partial views of each slider.

Figure 11:
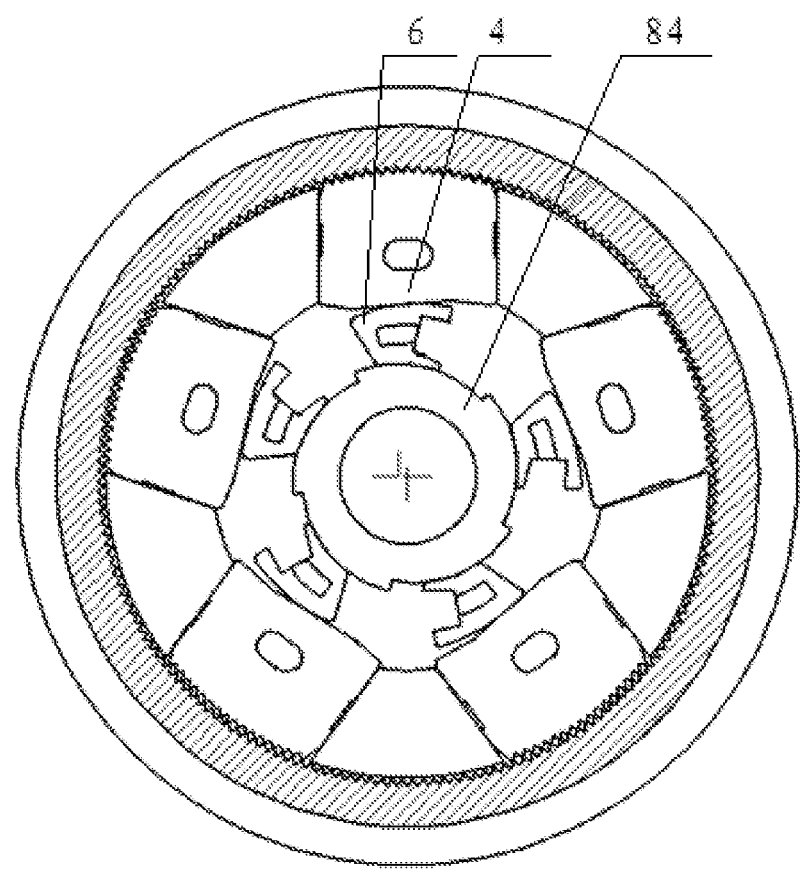
FIG. 11 is a sectional view of a first embodiment of double-sided self-locking of the angle adjusting device according to the present application.
Figure 12:
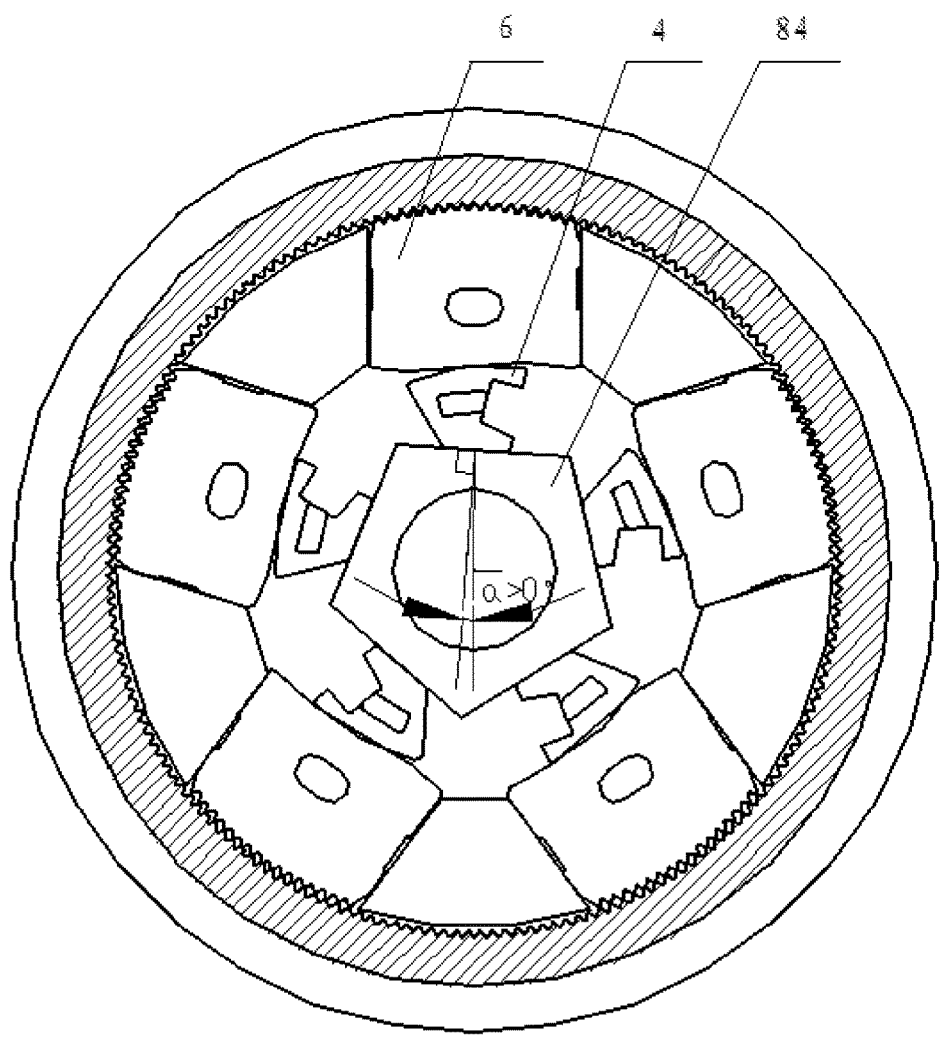
FIG. 12 is a sectional view of a second embodiment of double-sided self-locking of the angle adjusting device according to the present application.

FIGS. 6 to 10 are schematic views showing the sliders in different engagement degrees and schematic views of an unlocking member. FIG. 11 to FIG. 12 are schematic views of an embodiment having double-sided self-locking function. FIGS. 13 to 17 are schematic views of a first embodiment to a fourth embodiment.

The angle adjusting device according to the present application may be used for adjusting an angle of a seat back or adjusting a relative angle of other structures. The angle adjusting device includes a ratchet 2 having an inner ring provided with inner teeth 22, multiple sliders 4 each provided with outer teeth 42, an expansion and retraction mechanism, and a sliding groove plate 8 arranged coaxially with the ratchet 2 and rotatable with respect to the ratchet 2. The expansion and retraction mechanism is configured to control the multiple sliders 4 to move radially along the sliding groove plate 8, so as to allow the outer teeth 42 to engage with or disengage from the inner teeth 22, and the expansion and retraction mechanism can lock or unlock the multiple sliders 4. Specifically, the ratchet 2 is provided with n inner teeth 22.

M slider groups consisting of the multiple sliders 4 include one base slider group and m−1 deflecting slider groups, and the outer teeth 42 of each of the deflecting slider groups has an angular deflection about a central shaft 7 of the ratchet 2 with respect to the outer teeth 42 of the base slider group, and the angular deflection is (Z+k/m)360/n degrees, Z, m, n and k are all integers, and 1≤k≤m−1, and k is different for each of the deflecting slider groups when calculating the angular deflection.

The expansion and retraction mechanism may push the multiple sliders 4 to extend radially simultaneously, so as to allow the outer teeth 42 of the multiple sliders 4 to abut against or be engaged with the inner teeth 22, and then the multiple sliders 4 are locked.

It is to be noted that the ratchet 2 provided by the present application may be a common ratchet device in the conventional technology, which is typically an annular structure, has the inner teeth 22 arranged on an inner ring of the ratchet 2, and the inner teeth 22 are arranged successively and have a same shape, and each of the inner teeth extends towards the central shaft 7 of the ratchet 2 from the inner ring. According to the using requirement of the angle adjusting device, a bidirectional ratchet will be employed when performing two-direction adjustment. Certainly, the ratchet 2 may be other annular structures having the inner teeth 22. Specifically, the inner ring of the ratchet 2 is provided with n inner teeth 22, and the degree of each of the inner teeth 22 is 360/n, namely, an included angle between two adjacent teeth is 360/n. The degree of each of the inner teeth 22 refers to the degree of the inner tooth 22 occupying the central angle on the circumference of the ratchet 2, namely, n inner teeth 22 are evenly distributed on the circumference of the ratchet 2. The specific structure of the inner teeth 22 may be selected from inner teeth commonly used in the conventional technology.

The sliding groove plate 8 arranged coaxially with the ratchet 2 is provided with multiple sliders 4 slidable in radial directions of the ratchet 2, and each of the multiple sliders 4 is provided with the outer teeth 42 facing the ratchet 2. The outer teeth 42 have the same structure and can be engaged with the inner teeth 22. The multiple sliders 4 constitute m slider groups, and each of the slider groups may include one, two or more sliders 4. The m slider groups include a base slider group and m−1 deflecting slider groups, and the multiple slider groups are distributed on the circumference of the sliding groove plate 8, and the outer teeth 42 of each of the multiple sliders 4 face towards the inner teeth 22 of the ratchet 2.

The outer teeth 42 of the sliders 4 in the deflecting slider groups have an angular deflection about the central shaft 7 of the ratchet 2 with respect to the outer teeth 42 of the sliders 4 in the base slider group. The angular deflection in the present application refers to the angle difference between the angle of the outer teeth 42 of the sliders 4 of each of the deflecting slider groups and the angle of the outer teeth 42 of the sliders 4 of the base slider group in the circumferential direction, and the angle difference consists of a multiple of the degree of one outer tooth 42 and a phase difference of the outer teeth 42.

The angular deflection of the outer teeth 42 of each of the slider groups from the outer teeth 42 of the base slider group is $(Z+k/m)360/n$ degrees, where $1 \leq k \leq m-1$, and k is different for each of the deflecting slider groups in calculating the angular deflection. Namely, when calculating the angular deflection corresponding to different slider groups, the value of k is different, and the value of k cannot be the same for different deflecting slider groups. The value of integer Z can be randomly selected, which is mainly determined based on the number of the slider groups.

Taking the number of the slider groups m=5 as an example, that is, when there are four deflecting slider groups, the value of k can be $1 \leq k \leq 4$. When calculating the angular deflection of the outer teeth 42 of a first deflecting slider group from the outer teeth 42 of the base slider group, the value of k may be 2. When calculating the angular deflection of the outer teeth 42 of a second deflecting slider group from the outer teeth 42 of the base slider group, the value of k may be 4. When calculating the angular deflection of the outer teeth 42 of a third deflecting slider group from the outer teeth 42 of the base slider group, the value of k may be 1. Thus, when calculating the angular deflection of the outer teeth 42 of a fourth deflecting slider group from the outer teeth 42 of the base slider group, the value of k may be 3. Certainly, the deflecting slider groups may not be the selected sequential value, and the forgoing is only to illustrate that different slider groups cannot choose the same value k.

It is to be noted that, in the present application, the base slider group and the deflecting slider groups have no difference in structure, but simply have phase difference in the engagement with the ratchet 2. The above device includes one base slider group and at least one deflecting slider group, namely, the value m, the number of the slider groups, should be greater than or equal to two. In addition, the sliders 4 of the same deflecting slider group may have an angular interval equal to an integral multiple of the angle of one inner tooth 22 in the circumference, but do not have a phase difference.

Optionally, the sliders 4 may be arranged in radial sliding grooves 82 in the sliding groove plate 8, and multiple sliding grooves 82 are provided on the sliding groove plate and a fan-shaped boss 83 is formed between any two sliding grooves 82. Or, the sliders 4 are radially moved on the sliding groove plate 8 by other means.

Optionally, the selection of the integer Z in the above-described angular deflection calculation formula effects a multiple of the angle of one tooth in the interval among the sliders 4, and in order to allow the engagement of the sliders 4 with the ratchet 2 as stable as possible, the selection principle of Z is to have the sliders 4 distributed in the circumference as even as possible.

The expansion and retraction mechanism may be a cam mechanism in the conventional angle adjusting device, but particularly, the expansion and retraction mechanism of the present application needs to simultaneously push the multiple sliders 4 to extend radially, and in the extending process, all the multiple sliders 4 can abut against or be engaged with the inner teeth 22 of the ratchet 2. In addition, the expansion and retraction mechanism can also lock the positions of the multiple sliders 4 in contact with the ratchet 2 such that the multiple sliders 4 will not move reversely when the ratchet 2 is pressured. That is, whether the teeth of the ratchet 2 and the multiple sliders 4 are in a full engagement state, a half engagement state or an opposed state, the contact surfaces of the expansion and retraction mechanism and the multiple sliders are always in a self-locking state.

In the angle adjusting device according to this embodiment, the angular deflection allows each of the multiple sliders 4 to have a different state in engagement with the ratchet 2. The slider groups divide the degree of the inner teeth 22 into m parts, which forms m phases, and different slider groups are arranged corresponding to the inner teeth 22 at different phases, which allows the outer teeth 42 of the different sliders 4 to be engaged with the inner teeth 22 at different phases when the multiple sliders 4 extend outwardly. In the case that the multiple sliders 4 are extended outwards and engaged with the inner teeth, there may be one slider group whose outer teeth 42 are fully engaged with the inner teeth 22, and other slider groups whose outer teeth 42 are engaged with the inner teeth 22 leftward or rightward, such that the ratchet 2 cannot rotate clockwise or counterclockwise, thus achieving the securing of the ratchet 2. In another possible embodiment, the outer teeth 42 of all the multiple slider groups are engaged with the inner teeth 22 leftward or rightward, which can also achieve the securing of the ratchet 2. In the case that the leftward engagement and the rightward engagement occur simultaneously in the multiple sliders 4, the ratchet 2 cannot be rotated in a clockwise and counterclockwise direction, and the slider guide surfaces 44 can be brought into close contact with sliding groove guide surfaces on the sliding groove 82. In normal situation, each of the sliding groove guide surfaces may be a fan-shaped boss stressed surface 86, which can eliminate the gap of the ratchet 2, and achieve stable securing of the ratchet 2.

In summary, different outer teeth 42 can abut against or be engaged with the inner teeth 22 in a full engagement state, a half engagement state and an opposed state, and the sliders 4 can be engaged with the ratchet 2 regardless of the ratchet 2 is rotated to any angle. In the full stroke range in which the inner teeth 22 are engaged with the outer teeth 42, the expansion and retraction mechanism can push the sliders 4 to extend simultaneously in radial directions and can lock the positions of the multiple sliders 4, such that the multiple sliders 4 cannot be retracted under the pressure of the ratchet 2, thereby achieving the securing of the ratchet 2, and finally realizing angle stepless adjustment of the ratchet 2.

It is to be noted that when the number of the slider groups m=2, the outer teeth of the sliders of the base slider group may be at an angular distance from the outer teeth of the sliders of the deflecting slider group by $(Z+\frac{1}{2})360/n$.

Taking the number of the slider groups m=5 for example, reference is made to FIGS. 4 to 7. The five sliders 4 are respectively slider A, slider B, slider C, slider D and slider E, wherein, the outer teeth 42 of the slider A are in full engagement with the inner teeth 22 of the ratchet 2, and the outer teeth 42 of the slider B, the slider C, the slider D and the slider E are in non-full engagement with the inner teeth 22 of the ratchet 2. In the case that the core component is rotated around the center integrally, and when the sliders B, C, D, and E sliders are respectively in the position A, if the outer teeth 42 are in contact with a left side of the inner teeth 22, it is referred to as the leftward engagement, and if the outer teeth 42 are in contact with a right side of the inner teeth 22, it is referred to as the rightward engagement. Thus, FIGS. 5b and 5d show the leftward engagement, and FIGS. 5c and 5e show the rightward engagement. It is just because the non-fully-engaged sliders 4 include both leftward engagement and rightward engagement, the ratchet 2 can be secured at any angle, and the final effect is that the angle adjusting device achieves stepless adjustment.

For the non-full engagement state, the multiple sliders 4 will be pushed toward another side of the sliding groove 82 by the ratchet 2 until the multiple sliders 4 are engaged with the sliding grooves 82 and the outer teeth 42 are in contact with the inner teeth 22, and finally, the gap between the multiple sliders 4 and the sliding grooves 82 is eliminated. Any slider 4 which is not fully engaged with the inner teeth 22 can prevent the ratchet 2 from rotating in one direction (clockwise or counterclockwise).

The expansion and retraction mechanism in the angle adjusting device according to the present application is different from an expansion and retraction mechanism in the conventional technology, and the expansion and retraction mechanism in the angle adjusting device according to the present application is necessary to simultaneously allow the multiple sliders 4 to extend radially outwardly. The structure and function of the expansion and retraction mechanism are specifically introduced in this embodiment based on the above embodiment.

The expansion and retraction mechanism includes a flange 84, an unlocking member, multiple wedges 6 arranged in one-to-one correspondence relationship with the multiple sliders 4 and multiple elastic members 5 arranged in one-to-one correspondence relationship with the multiple wedges 6.

The flange 84 is provided on the sliding groove plate 8, and can be fixed to the sliding groove plate 8. Each of the multiple wedges 6 is arranged between the flange and two adjacent sliders 4 in a radial direction. The multiple wedges 6 abut against the flange 84 via the multiple elastic members 5 in circumferential directions. The multiple elastic members are arranged between the sliding groove plate and the multiple wedges 6, and the multiple elastic members allow the multiple wedges 6 to move in directions for pushing the multiple sliders 4 to move outwards radially.

Contact surfaces of the multiple wedges 6 in contact with the multiple sliders 4 are self-locking surfaces in radial directions, and an elastic force of each of the multiple elastic members 5 allows the corresponding wedge 6 to move circumferentially, and allows the corresponding slider to extend outwardly. When the multiple wedges 6 are moved in directions against the elastic forces of the multiple elastic members 5, the multiple sliders 4 are retracted radially. Contact surfaces of the multiple wedges 6 in contact with the flange 84 are self-locking surfaces in radial directions, and during the full process of the contact state of the teeth of the sliders 4 and the teeth of the ratchet switching from the opposed state to the full engagement state, the pushing forces of the multiple elastic members enables all self-locking surfaces to be in a self-locking state. When the multiple wedges move in directions against the elastic forces of the multiple elastic members 5, the multiple wedges 6 can be retracted in the radial directions. The unlocking member is configured to push the multiple wedges to release self-locking, and allow the multiple sliders 4 to retract radially and further allow the inner teeth 22 to be separated from the outer teeth 42.

Optionally, the flange 84 may be arranged coaxially with the sliding groove plate 8.

Figure 6:
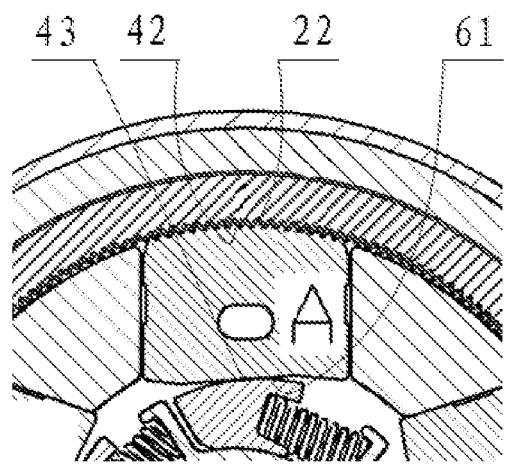
FIG. 6 is a schematic view showing full engagement in the embodiment of the angle adjusting device according to the present application.
Figure 7:
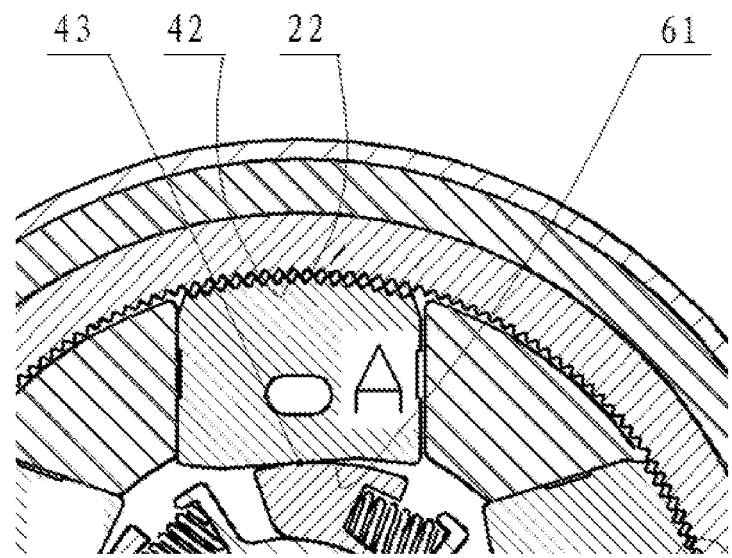
FIG. 7 is a schematic view showing an opposed state in the embodiment of the angle adjusting device according to the present application.
Figure 8:
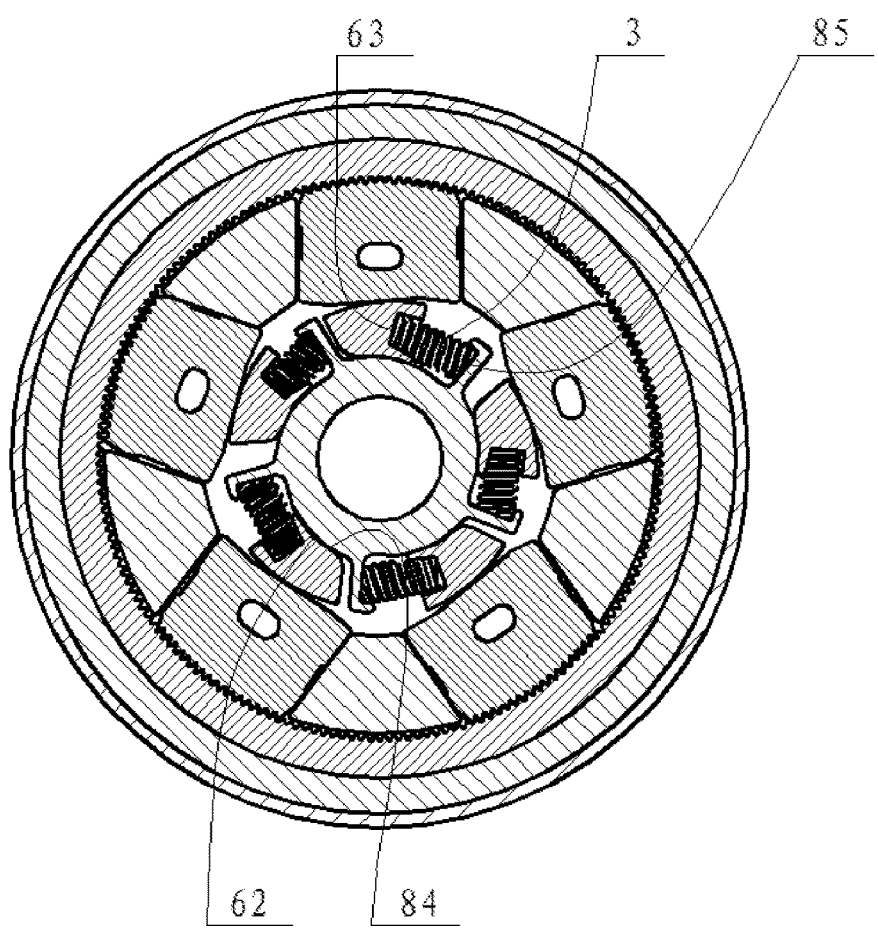
FIG. 8 is a schematic view of multiple elastic members in the embodiment of the angle adjusting device according to the present application.

Specifically, reference is made to FIGS. 6 to 8. FIGS. 6 to 8 are respectively a schematic view showing the full engagement state, a schematic view showing the teeth opposed state and a schematic view showing an arrangement of the elastic members. Multiple elastic member fixing grooves 85 may be provided in an outer circumferential surface of the flange 84, each of which is configured to engage and fix one end of each of the multiple elastic members 5. The multiple wedges 6 are further provided on the outer circumferential surface of the flange 84. Each of the multiple wedges 6 is arranged between two elastic member fixing grooves 85 in the circumferential direction and abuts against a corresponding elastic member fixing groove 85 on one side by a corresponding elastic member 5 in a compressed state, such that the multiple wedges 6 are biased towards opposed sides on which the multiple elastic members 5 are provided. The multiple elastic elements can ensure that the multiple wedges 6 can be more tightly wedged between slider self-locking surfaces 43 and the flange 84, thus the outer teeth 42 is engaged with the inner teeth 22 as closer as possible.

The wedge 6 is in contact with the slider 4 on an outer side in the radial direction and the wedge 6 is also in contact with the flange 84 on an inner side in the radial direction. It is to be noted that the self-locking surface according to this embodiment refers to a self-locking surface that enables the wedge 6 to be secured when the slider 4 is subjected to the pressure of the ratchet 2, which enables the slider 4 to be self-locked and secured, but not to retract in the radial direction.

Two types of self-locking surfaces are provided according to this embodiment. One type is that a self-locking surface is formed by a wedge 6 and a slider 4, i.e., a wedge self-locking surface 61 of the wedge 6 and a slider self-locking surface 43 of the slider 4. The slider self-locking surface 43 faces towards a side on which a corresponding elastic member 5 is provided. An elastic restoring force of the elastic member 5 biases the wedge 6, which allows the slider 4 to extend outwards radially. The wedge 6 moves towards the elastic member 5, and the slider 4 is retracted radially. When the slider 4 is pressured by the ratchet 2, the self-locking surface enables the slider 4 to be secured but not retracted. The other type is that a self-locking surface is formed by the wedge 6 and the flange 84, i.e., a wedge rotation surface 62 and a flange circumferential surface. The wedge rotation surface 62 faces towards the side on which the elastic member 5 is provided. When the wedge 6 is subjected to a pressure transferred by the slider 4 from the ratchet 2, the self-locking surface allows the wedge to be secured but not retracted radially, which ensures the securing of the slider 4.

In use, the elastic member 5 drives the wedge 6 to move circumferentially along the flange 84. By the contacting of the slider self-locking surfaces 43 and the wedge self-locking surfaces 61, the slider 4 is driven to move radially outwards along the sliding groove plate guide surface of the sliding groove plate 8, till the outer teeth 42 is in contact with the inner teeth 22. This contact includes the cases in which the outer teeth 42 and the inner teeth 22 are in the full engagement state, the half engagement state and the opposed state. In the full stroke range in which the outer teeth 42 are engaged with the inner teeth 22A, the state further includes that the outer teeth 42 and the inner teeth 22 are in a teeth top opposed state, and the wedge self-locking surface 61 and the slider self-locking surface 43 are kept in contact with each other and form self-locking. Similarly, in the locking state, the wedge rotation surface 62 also maintains contact with the flange circumferential surface all along to form self-locking.

It is to be noted that the wedge 6 according to this embodiment has double self-locking surfaces, and when the wedge 6 moves in the direction of compressing the elastic member 5, i.e. when the wedge is unlocked, the movement of the wedge 6 has a radial inward component, which provides a space for the radial retraction of the slider 4. During the unlocking process, the contact point of the slider 4 with the wedge 6 moves downwards such that under the wedge 6 moves by the same distance in the circumferential direction, the self-locking range of the wedge 6 with the slider 4 can be greater, thus ensuring that the slider 4 can be always self-locked in various states of being in contact with the ratchet 2, which ensures the stability of position of the slider 4, and thereby enables the slider 4 to have a secured position with respect to the ratchet 2. From another point of view, the unlocking stroke of the wedge 6 is shortened. As compared with a wedge having a single self-locking surface, the wedge 6 having the double self-locking surface has a short locking stroke and a small unlocking angle, which facilitates the user unlocking the seat back with a small manual rotation angle.

It is to be mentioned that the self-locking characteristics of the self-locking surface is determined by a self-locking lead angle, and the magnitude of the self-locking lead angle is determined by a friction coefficient of the material. According to the material of the wedge 6, the flange 84 and the slider 4 of the angle adjusting device in the conventional technology, a reliable self-locking lead angle may generally be about 4.5 degrees. In addition, all the wedges 6 need to be biased clockwise or counterclockwise simultaneously to ensure the control of the unlocking member.

Optionally, the abutment of the above wedge 6 with the elastic member 5 may also be achieved by other means on the flange 84 rather than the elastic member fixing groove 85.

Optionally, a wedge groove 63 is provided in the wedge 6 and is configured to engage the elastic member 5 to avoid disengagement of the elastic member 5 from the wedge 6 during interaction. Certainly, other means to fix the elastic member 5 may also be possible.

In the angle adjusting device according to this embodiment, the slider 4 is driven by an independent wedge 6 and an independent elastic member 5. During the locking process, in the whole process of the outer teeth 42 and the inner teeth 22 switching from the opposed state to the full engagement state, the wedge self-locking surface 61 forms self-locking with the slider self-locking surface 43 all along, and the slider 4 does not retract radially when there is a load on the ratchet 2.

Reference is made to FIGS. 11 and 12. FIGS. 11 and 12 are sectional views of a first embodiment and a second embodiment of the double-sided self-locking respectively.

On the basis of any one of the above embodiments, the flange 84 is a regular x-shaped flange and the regular x-shaped flange includes x sides, each of which is configured to abut against one wedge 6. The number of the sides x is equal to the number of the multiple sliders, and an included angle between a movement direction of the wedge 6 compressing the elastic member 5 along a lateral side and a radial retraction direction of the slider 4 is an acute angle.

On the basis of any one of the above embodiments, the flange 84 is a ratchet having one-way outer ratchet teeth. The wedge 6 abuts against the surface of outer teeth 42 of the one-way ratchet teeth, and the surface of outer teeth self-locks with the wedge in the radial direction. The elastic member 5 biases the wedge 6 toward a tooth tip direction of the one-way ratchet teeth, such that an included angle between the movement direction of the wedge compressing the elastic member along the outer teeth surface and the radial retraction direction of the slider is an acute angle.

Optionally, the elastic member 5 provided in the above-described embodiments may be a conventional elastic device such as a spring or a torsion spring.

On the basis of any one of the above embodiments, the slider 4 is provided with an axial slider boss 41, and the wedge 6 is provided with an axial wedge boss 64. The unlocking member and the sliding groove plate 8 are coaxially arranged. The unlocking member is provided with multiple slider control grooves 31 each in cooperation with the slider boss 41 and multiple wedge control grooves 33 each in cooperation with the wedge boss 64. The rotation of the unlocking member in the unlocking direction can simultaneously cause the wedge 6 to move in a direction against the elastic force of the elastic member 5 and cause the slider to retract radially.

Figure 9:
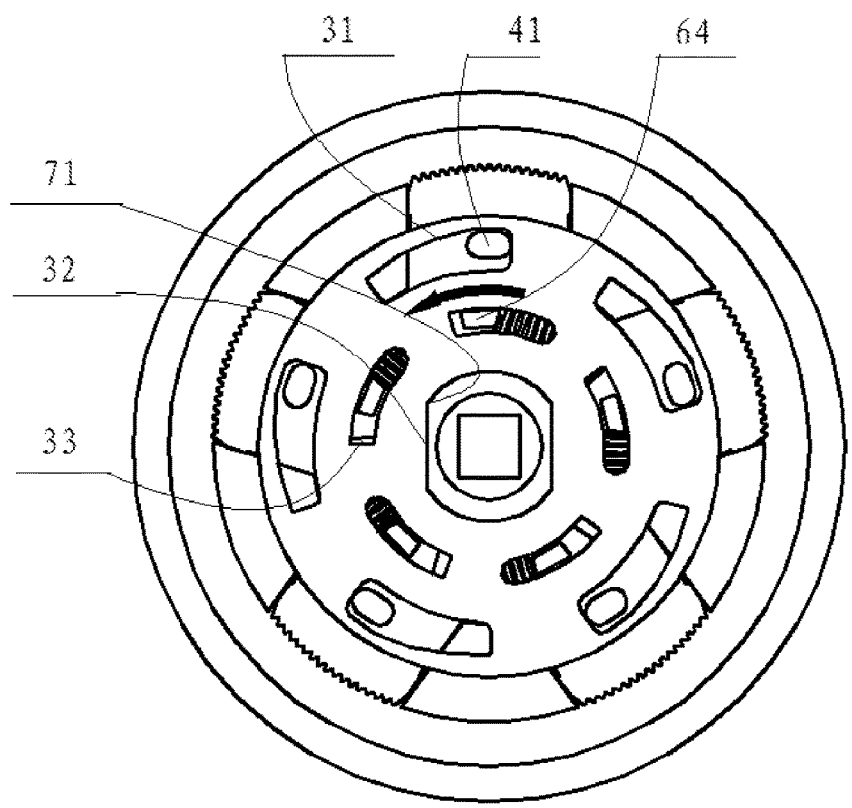
FIG. 9 is a sectional view of a locked state in the embodiment of the angle adjusting device according to the present application.
Figure 10:
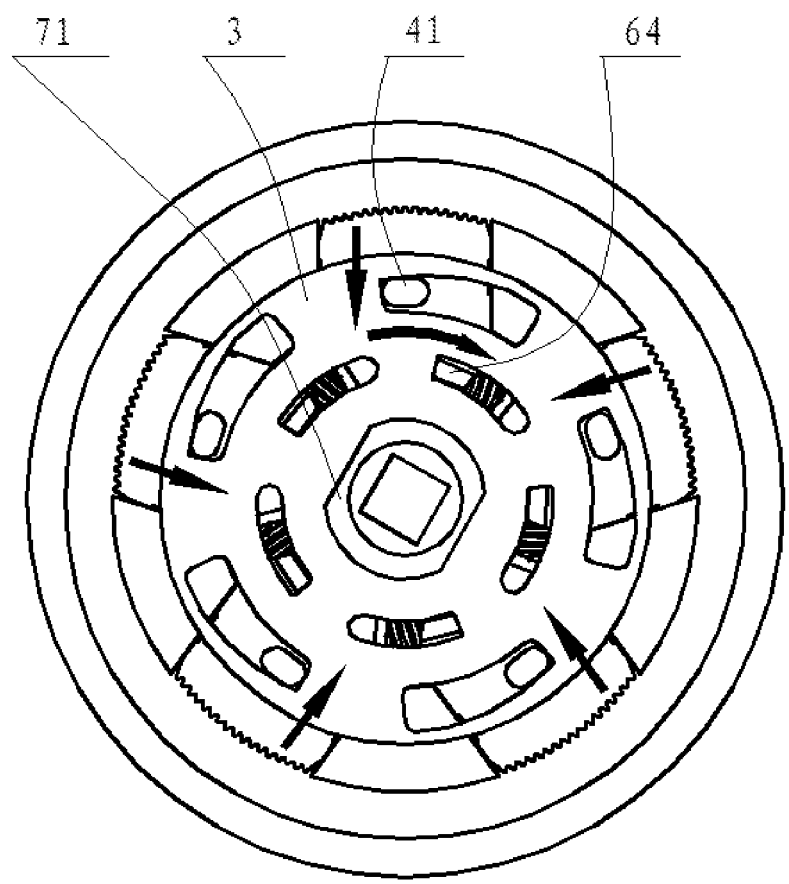
FIG. 10 is a sectional view showing an unlocked state in the embodiment of the angle adjusting device according to the present application.

Specifically, reference is made to FIGS. 9 and 10. FIG. 9 is a sectional view of a locked state, and FIG. 10 is a sectional view of an unlocked state, both of which are sectional views with the internal portion of the core component of the ratchet 2 and a sheath 1 removed. The unlocking member is an unlocking cam 3 coaxially arranged with the sliding groove plate 8 and rotatable with respect to the sliding groove plate 8. The unlocking cam 3 is provided with multiple slider control grooves 31 and multiple wedge control grooves 33, and each of the slider control grooves 31 is a curved groove which has different distances from the central shaft 7 in the circumferential direction. The central hole of the unlocking cam 3 is a non-circular hole 32. There are two limit states in the rotation of the unlocking cam 3, which are the locked and unlocked states respectively. In the locked state, the wedge 6 is biased by the elastic force of the elastic member 5 in a direction away from the elastic member 5, and the elastic member 5 is in a relative long state in a compressed state, and the slider 4 is in an extended state. In the unlocked state, the wedge 6 is driven by a corresponding wedge control slot 33 to compress the elastic member 5 and the slider 4 is retracted radially. The switch between the two states simply requires rotating the unlocking cam 3.

FIG. 9 is a schematic view showing a locked state in which one end of the central shaft 7 extending from the core component is generally connected to a handle, and an external spring can be mounted to the handle. In the locked state, the unlocking cam 3 rotates to the position shown in FIG. 9 in the counterclockwise direction under the action of an external spring, and in this position, the wedge 6 is rotated in the unlocking direction (i.e., the counterclockwise direction shown in FIG. 9) under the action of the elastic member 5, the wedge 6 drives the slider 4 to extend radially outwardly till the outer teeth 42 are engaged with the inner teeth 22. FIG. 10 is a schematic view of the unlocked state, and when the operating handle is rotated in the unlocking direction, a flat step 71 on the central shaft 7 drives the unlocking cam 3 to rotate clockwise, and the wedge control groove 33 in the unlocking cam 3 drives the wedge 6 to rotate in the unlocking direction (i.e., the clockwise direction shown in FIG. 10), such that the wedge 6 is pulled out from the position between the slider self-locking surface 43 and the flange 84, and meanwhile, the slider control groove 31 in the unlocking cam 3 drives the slider 4 to rotate radially inwards, till the outer teeth 42 of the multiple sliders 4 are completely disengaged from the inner teeth 22 of the ratchet 2, and the ratchet 2 may be rotated to any desired angle about the center of the sliding groove plate 8.

In the angle adjusting device according to this embodiment, the control and conversion of the locked state and the unlocked state are achieved by using the unlocking member, and the operation is convenient and stable.

Optionally, the unlocking mode according to the present application is not limited to the above, and any means which can be used to achieve the control and switch between the locked state and the unlocked state falls into the scope protected by the present application.

The angle adjusting devices according to the embodiments described above all employ a way that enables each of the slider groups to have an angular deflection, which ensures that the multiple sliders 4 engaged with the ratchet 2 can have different phases.

If, however, the multiple sliders 4 are arranged in an ascending order of phases in the circumferential direction, the difference between engagement degrees of adjacent sliders 4 with the ratchet 2 will be small and the difference between engagement degrees of the sliders 4 having a large distance with the ratchet 2 will be great. If the ratchet 2 is subjected to a large load, the stressed area is concentrated partially rather than distributed evenly, which may cause a part to be damaged first. It is further necessary to have the sliders 4 with different engagement degrees evenly distributed in the circumferential direction in order to avoid unevenness of the force and the partial damage caused accordingly, so as to ensure the contact strength between the multiple sliders 4 and the ratchet 2. Further, the multiple sliders 4 with different engagement degrees are evenly distributed in the circumferential direction.

On the basis of any of the above embodiments, in the case of the number of the slider groups m≥5, the outer teeth 42 of two circumferentially adjacent slider groups have an adjacent angular deflection about the central axis 7 of the ratchet 2. The adjacent angular deflection is $(Z_1+k/m)360/n$ degrees, where $Z_1$ is an integer, m is the number of the slider groups, n is the number of inner teeth, and m, n and k are all integers, and 2≤k≤m−2 or directly select k=2 or 3.

The degree of each tooth of the ratchet 2 is a=360/n. Being limited by the existing manufacturing level, a is generally about 2 degrees. The angular adjusting device is provided with m sliders 4, the relative angle between teeth of each of the sliders 4 in the same slider group is substantially Pa (P is an integer), thus, a basic phase difference is a/m, and the phase difference is remainder of relative angle of m sliders divided by a.

It is to be noted that, in this embodiment, the positions of the slider groups are arranged on the basis that each of the deflecting slider groups has a different phase difference with the base slider group.

It is to be noted that, in the case that the number of the slider groups m=2, the outer teeth of the sliders of the base slider group remain an angular distance from the outer teeth of the sliders of the offset slider group by $(Z+\frac{1}{2})360/n$. In the case that the number of the slider groups m=3, the outer teeth of the sliders of the base slider group remain an angular distance from the outer teeth of the sliders of the deflecting slider groups by $(Z+\frac{1}{3})360/n$.

This embodiment mainly defines that the phase difference between the adjacent sliders 4 is substantially equal to k times of the basic phase difference (k is an integer greater than or equal to 2), which enables the engagement degrees of adjacent sliders 4 to have a large difference, and the engagement degrees of the sliders 4 at opposed positions to be similar, thereby enabling the angle adjusting device to be stressed in a balanced manner. Specifically, the sliders 4 having similar engagement degrees are arranged at positions far from each other, or form a triangular arrangement.

Optionally, the selection range and requirements of $Z_1$ in the calculation of the adjacent angular deflection described above need to enable all the multiple sliders 4 to be distributed evenly in the circumferential direction as much as possible, and the even distribution can equalize the force on the ratchet 2.

Further, on the basis of the above-described embodiment, the adjacent angular deflection of the outer teeth 42 of the two circumferentially adjacent slider groups is $(Z_1+k/m)360/n$ degrees, where $Z_1$ is an integer, m is the number of the slider groups, n is the number of the inner teeth, m and n are all integers, and k is equal to 2 or 3.

In another aspect, the outer teeth 42 of the two circumferentially alternate slider groups have an alternate angular deflection about the central axis 7, and the alternate angular deflection is $(Z_2+k/m)360/n$, where $Z_2$ is an integer, m is the number of the slider groups, n is the number of inner teeth, m and n are all integers, and k=1 or 2.

In this embodiment, the control to the angular deflection of adjacent angles and the angular deflection of alternate angles can be performed simultaneously, or, one of the angular deflection of adjacent angles and the angular deflection of alternate angles is controlled. Since the number of m of the slider groups is different, there will be various possible implementations, and the implementations can be variously combined.

Figure 13:
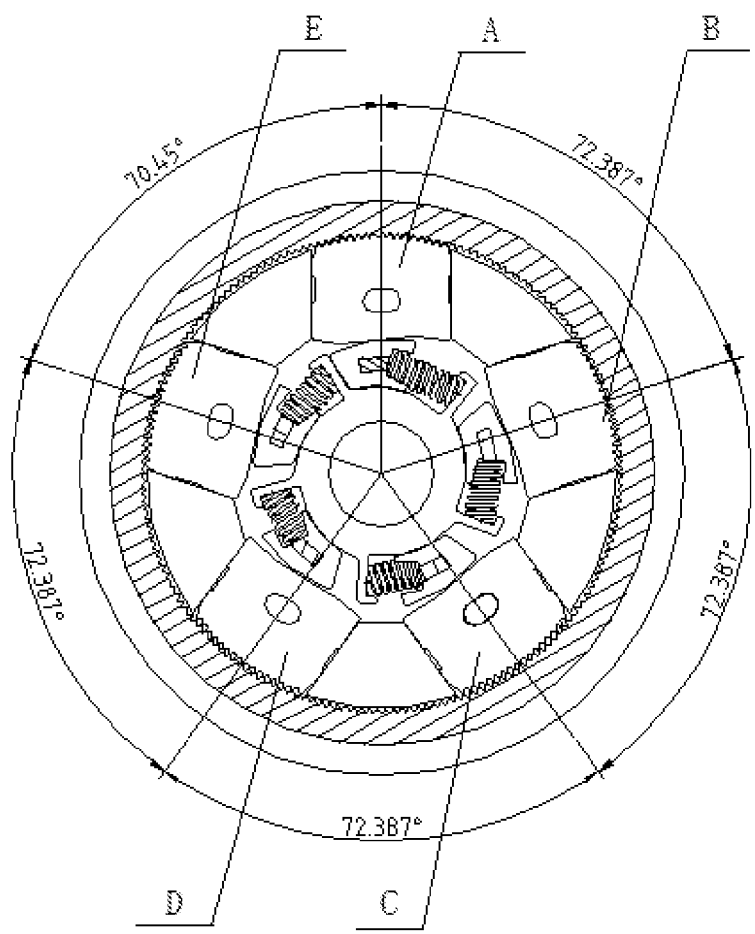
FIG. 13 is a sectional view of a first embodiment of the angle adjusting device according to the present application.

Taking the number of the slider groups m=5 as an example, in the case that each slider group includes only one slider 4. Reference is made to FIG. 13, which is a sectional view of a first embodiment, the five slider groups may include total 5 sliders, i.e., sliders A, B, C, D, E arranged circumferentially in the clockwise direction, and the five sliders are distributed substantially evenly.

In a more reliable embodiment, taking the slider A as a reference, viewed from included angles in a clockwise direction, the phase difference between the slider B and the slider A is two times of the basic phase difference, and the phase difference between the slider C and the slider A is four times of the basic phase difference, the phase difference between the slider D and the slider A is one time of the basic phase difference, and the phase difference between the slider E and the slider A is three times of the basic phase difference.

From this embodiment, an adjacent angular deflection between each two adjacent sliders 4 is $(Z_1+2/m)360/n$, and the phase difference is two times of the basic phase difference, and the sliders 4 can be evenly distributed based on engagement degrees. It is to be mentioned that, the above description is made by taking clockwise included angles for instance, and it is known that the two times of the basic phase difference of a clockwise included angle is equal to the three times of the basic phase difference of a counterclockwise included angle, which can all achieve an even distribution of engagement degrees of the sliders 4.

In a second reliable embodiment, taking the slider A as a reference, viewed from included angles in the clockwise direction, the phase difference between the slider B and the slider A is three times the basic phase difference, and the phase difference between the slider C and the slider A is one time of the basic phase difference, and the phase difference between the slider D and the slider A is four times of the basic phase differences, and the phase difference between the slider E and the slider A is two times of the basic phase difference. Similar to the above embodiments, the phase difference between each two adjacent sliders 4 is two times of the basic phase difference, and the engagement degrees of the sliders 4 are distributed evenly.

Accordingly, the phase difference between adjacent sliders is two times of the basic phase difference. The phase difference between alternate sliders is one time of the basic phase difference, which enables the sliders with difference engagement degrees to be distributed as even as possible.

Figure 14:
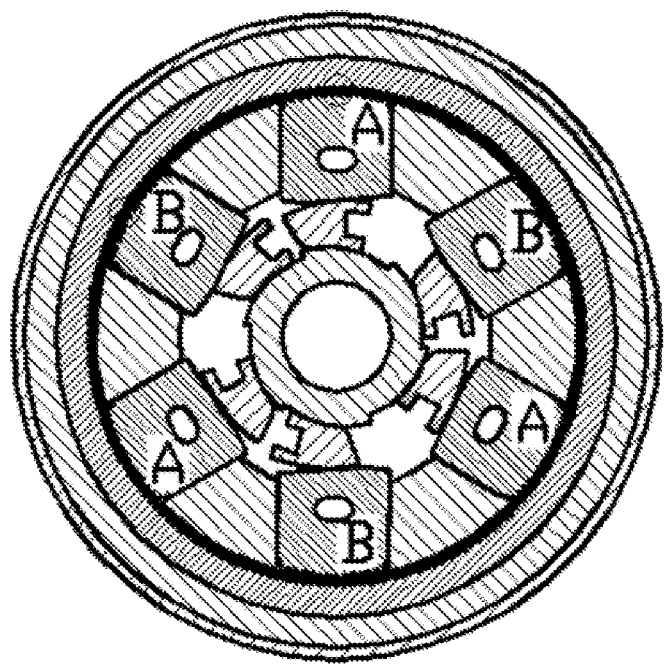
FIG. 14 is a sectional view of a second embodiment of the angle adjusting device according to the present application.

Taking the number of the slider groups m=6 as an example, when each of the slider groups includes only one slider 4, please refer to FIG. 14, the six slider groups include six sliders A, B, C, D, E and F, and the six sliders are arranged circumferentially in the clockwise direction, and the six sliders are substantially evenly distributed. The angle of one inner tooth is equally divided into six parts, thus 1 to 6 phases can be acquired respectively.

In the first arrangement, taking clockwise included angles as the reference, the phase difference between the slider B and the slider A is four times of the basic phase difference, the phase difference between the slider C and the slider A is one time of the basic phase difference, and the phase difference between the slider D and the slider A is three times of the basic phase difference, the phase difference between the slider E and the slider A is five times of the basic phase difference, and the phase difference between the slider F and the slider A is two times of the basic phase difference. Sliders A to F respectively correspond to phases 1, 5, 2, 4, 6, and 3. In this arrangement, the phase difference between each adjacent two sliders is two times of the basic phase difference. It is to be noted that, two times of the basic phase difference of a clockwise included angle is the same as four times of the basic phase difference of a counterclockwise included angle, which enables the engagement degrees of the sliders to be evenly distributed.

In a second arrangement, taking clockwise included angles as the reference, the phase difference between the slider B and the slider A is three times of the basic phase difference, the phase difference between the slider C and the slider A is five times of the basic phase difference, and the phase difference between the slider D and the slider A is one time of the basic phase difference, the phase difference between the slider E and the slider A is four times of the basic phase difference, the phase difference between the slider F and the slider A is two times of the basic phase difference. Sliders A to F respectively correspond to phases 1, 4, 6, 2, 5 and 3. In this arrangement, the phase difference between each adjacent two sliders is two times of the basic phase difference.

In a third arrangement, taking clockwise included angles as the reference, the phase difference between the slider B and the slider A is four times of the basic phase difference, the phase difference between the slider C and the slider A is two time of the basic phase difference, and the phase difference between the slider D and the slider A is five times of the basic phase difference, the phase difference between the slider E and the slider A is one time of the basic phase difference, the phase difference between the slider F and the slider A is three times of the basic phase difference. Sliders A to F respectively correspond to phases 1, 5, 3, 6, 2 and 4. In this arrangement, the phase difference between each adjacent two sliders is two times of the basic phase difference, which can ensure an even distribution of the engagement degrees of the sliders.

In a fourth arrangement, taking clockwise included angles as the reference, the phase difference between the slider B and the slider A is three times of the basic phase difference, the phase difference between the slider C and the slider A is one time of the basic phase difference, and the phase difference between the slider D and the slider A is five times of the basic phase difference, the phase difference between the slider E and the slider A is two times of the basic phase difference, the phase difference between the slider F and the slider A is four times of the basic phase difference. Sliders A to F respectively correspond to phases 1, 4, 2, 6, 3 and 5. In this arrangement, the phase difference between each adjacent two sliders is two times of the basic phase difference, which can ensure an even distribution of the engagement degrees of the sliders.

In a fifth arrangement, taking clockwise included angles as the reference, the phase difference between the slider B and the slider A is two times of the basic phase difference, the phase difference between the slider C and the slider A is four times of the basic phase difference, and the phase difference between the slider D and the slider A is one time of the basic phase difference, the phase difference between the slider E and the slider A is five times of the basic phase difference, the phase difference between the slider F and the slider A is three times of the basic phase difference. Sliders A to F respectively correspond to phases 1, 3, 5, 2, 4 and 6. In this arrangement, the phase difference between each adjacent two sliders is two times of the basic phase difference, which can ensure an even distribution of the engagement degrees of the sliders.

In a six arrangement, taking clockwise included angles as the reference, the phase difference between the slider B and the slider A is two times of the basic phase difference, the phase difference between the slider C and the slider A is five times of the basic phase difference, and the phase difference between the slider D and the slider A is three times of the basic phase difference, the phase difference between the slider E and the slider A is one time of the basic phase difference, the phase difference between the slider F and the slider A is four times of the basic phase difference. Sliders A to F respectively correspond to phases 1, 3, 6, 4, 2 and 5. In this arrangement, the phase difference between each adjacent two sliders is two times of the basic phase difference, which can ensure an even distribution of the engagement degrees of the sliders.

As can be seen from the above six arrangements, in the case that the phase difference between adjacent sliders 4 is two times of the basic phase difference or three times of the basic phase difference, the engagement degrees can be ensured to be substantially evenly distributed.

In order to ensure the stable engagement of each of the multiple sliders 4 with the ratchet 2, on the basis of any one of the above embodiments, the number of the sliders 4 in the base slider group is equal to the number of the sliders 4 in each of the deflecting slider groups, and the slider groups are alternately arranged in the circumferential direction, and the adjacent sliders in the circumferential direction belongs to different slider groups.

Optionally, the sliders 4 of all the slider groups are located in the same plane. In addition, all the sliders 4 have the same thickness. Both of the above two manners can improve the smoothness of the contact of the slider 4 with the ratchet 2.

In the above-described embodiments, the multiple factor of one tooth is not defined, that is, when calculating the angular deflection, the adjacent angular deflection and the alternate angel deflection, the Z, $Z_1$ and $Z_2$ are all random numbers, and are not limited. The selecting principle is to allow the sliders 4 to be distributed in the circumferential direction as even as possible. For enabling the selection of the random quantity to have reference and limitation, on the basis of any one of the above embodiments, each of the slider groups includes a sliders 4, and the two circumferentially adjacent sliders 4 have an angular distance in the circumferential direction by an angle ranging from 360/ma−10 degrees to 360/ma+10 degrees.

It is to be noted that random numbers can be selected simply by meeting the above condition, or can be selected as integer multiples of the above range.

In the embodiments according to the present application, the number of the sliders 4 in the slider groups is defined based on the difference numbers of the slider groups.

In the case that the number of the slider groups m=2, reference is made to FIG. 14. FIG. 14 shows the case where two slider groups (slider group A and slider group B) are included. Each slider group can include three sliders 4; the angular distance from the outer teeth of the slider group B to the outer teeth of the slider group A is integer teeth pitches plus ½ times of a tooth pitch.

Optionally, three sliders in the slider group A are evenly distributed circumferentially apart from each other by 120 degrees, and three sliders in the slider group B are evenly distributed circumferentially with an angular distance by 120 degrees.

Optionally, each slider group may also include only one slider 4, or only two sliders 4, however, each slider group including three sliders 4 is found to be most stable in the practice. In addition, the number of teeth of the ratchet 2 is preferably an integral multiple of 3 in order to ensure equalization of forces and simplify the manufacturing process of the sliding groove plate.

Figure 15A:
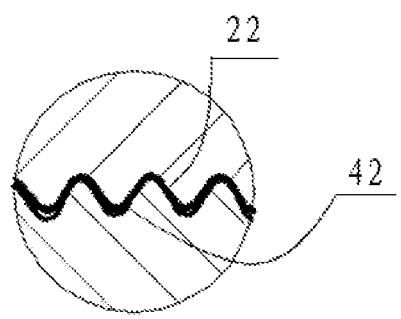
FIG. 15a is a schematic partial view of the slider A in FIG. 14.
Figure 15B:
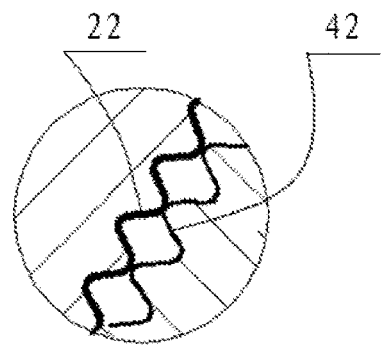
FIG. 15b is a schematic partial view of the slider B in FIG. 14.
Figure 15C:
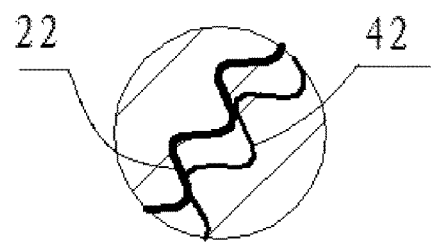
FIG. 15c is a schematic partial view of another embodiment of the slider A in FIG. 14.
Figure 15D:
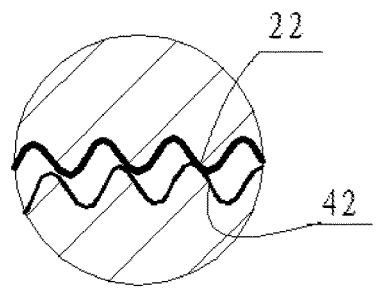
FIG. 15d is a schematic partial view of yet another embodiment of the slider B in FIG. 14.

Reference is made to FIGS. 15*a* to 15*d*. FIGS. 15*a* and 15*b* show that the slider A and the ratchet 2 are in full engagement state, and the slider B and the ratchet 2 are in a opposed state. FIGS. 15*c* and 15*b* show that the slider A and the ratchet 2 are in a rightward engagement state, the slider B and the ratchet 2 are in a leftward engagement state, and the ratchet 2 cannot be rotated in such states. Since the bidirectional teeth misalignment state is formed, the gap between the slider 4 and the sliding groove 82 can be eliminated simultaneously, which further ensures the stability of the slider, and achieves the stable positioning of the ratchet 2.

Figure 16:
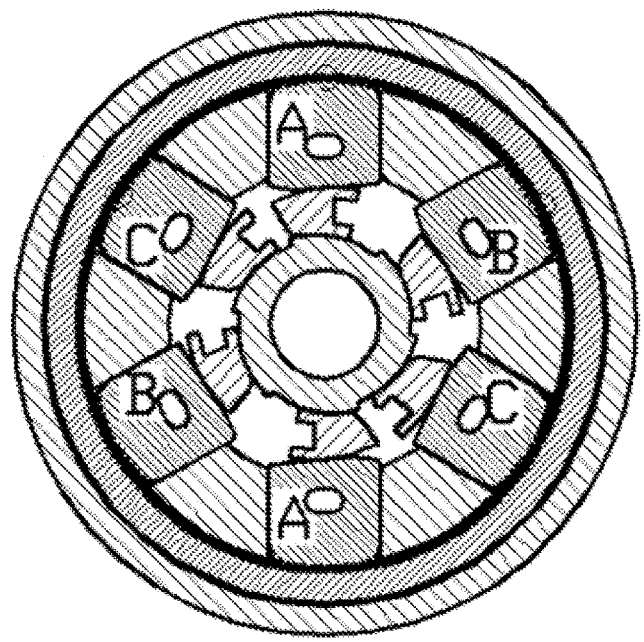
FIG. 16 is a sectional view of a third embodiment of the angle adjusting device according to the present application.

When the number of the slider groups m=3, reference is made to FIG. 16. FIG. 16 shows the case including three slider groups (slider group A, block group B and slider group C), and each of the slider groups includes two or three sliders.

Figure 17:
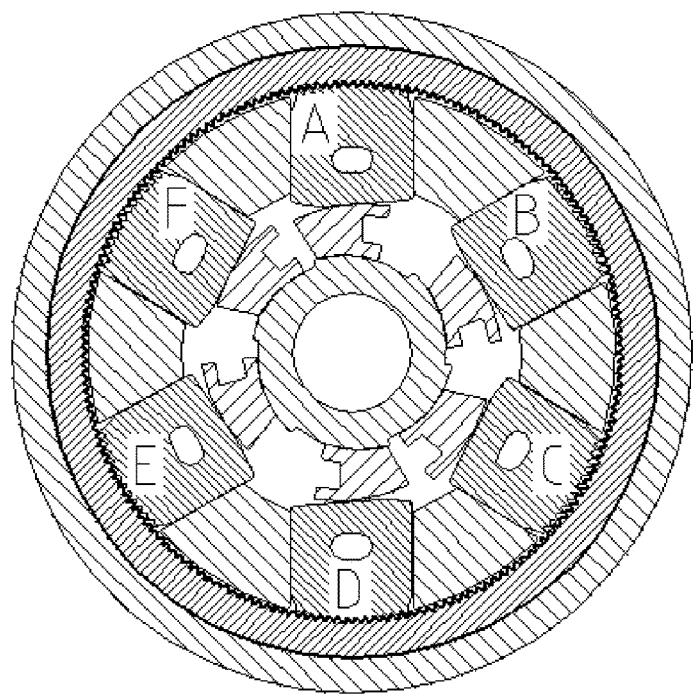
FIG. 17 is a sectional view of a fourth embodiment of the angle adjusting device according to the present application.

In the case that the number of the slider groups m≥4, taking m=6 as an example, reference is made to FIG. 17. In FIG. 17, six slider groups (slider group A, slider group B, slider group C, slider group D, slider group E, and slider group F) are included, and each of the slider groups may include one slider.

On the basis of any of the embodiments described above, the contact strength of the inner teeth 22 with the outer teeth 42 is greater than the contact strength of the radial sliding groove 82 of the sliding groove plate 8 with the slider 4. During the seat angle adjustment, when the inner teeth 22 are in contact with and engaged with the outer teeth 42 and when the load of the ratchet 2 is large, the sliding groove 82 is apt to be deformed compared with the ratchet 2 since the sliding groove 82 has a low contact strength, such that at least half of the outer teeth 42 in the circumferential direction can enter closer engagement with the inner teeth 22, thereby ensuring the safety of the user.

Optionally, on the basis of any of the above embodiments, the sheath 1 is provided outside the ratchet 2 to protect the rotation of the ratchet 2. It is to be noted that the ratchet 2 includes a ratchet outer ring 21 and inner teeth 22 provided on the ratchet outer ring 21.

Optionally, the outer circumference of the sliding groove plate 8 is provided with a sliding groove plate inner ring 81 for connecting with the sheath 1.

In addition to the angle adjusting device according to the above embodiments, an angle adjustable seat is further provided according to the present application, which includes the angle adjusting device according to the above-described embodiment. The seat includes a seat back, a seat basin and the angle adjusting device configured to adjust a relative angle between the seat back and the seat basin. The ratchet 2 and the sliding groove plate 8 of the angle adjusting device are connected to the seat back and the seat basin respectively. Generally, the ratchet 2 is connected to the seat back and the sliding groove plate 8 is connected to the seat basin. However, according to different requirements of use, it may also be embodied as that the ratchet 2 is connected to the seat basin, and the sliding groove plate 8 is connect to the seat back. It is to be noted that in the above-mentioned angle adjustment process, an angular position of one of the seat back and the seat basin is fixed, and the other one of the seat back and the seat basin is rotatable.

It is to be noted that, the above connection should refer to a rigid connection in which the rotation of the ratchet 2 can cause the angle of the seat back to change and the sliding groove 8 is rigidly and fixedly connected to the seat cup.

Since being provided with the above-described angle adjusting device, the seat can improve the angle adjusting precision of the seat back and the seat cup, and provide the user with various angles. Reference may be made to the conventional technology for the structure of the other parts of the seat, which will not be described here.

The above embodiments are described in a progressive manner. Each of the embodiments is mainly focused on describing its differences from other embodiments, and references may be made among these embodiments with respect to the same or similar portions among these embodiments. Any two or more of the embodiments provided by the present application can be combined on the premise of not impact the implementation.

The angle adjusting device and a seat having the angle adjusting device provided according to the present application are described in detail hereinbefore. The principle and the embodiments of the present application are illustrated herein by specific examples. The above description of examples is only intended to help the understanding of the method and concept of the present application. It should be noted that, for the person skilled in the art, a few of modifications and improvements may be made to the present application without departing from the principle of the present application, and these modifications and improvements are also deemed to fall into the scope of protection of the present application defined by the claims.

What is claimed is:
1. An angle adjusting device, comprising:
a ratchet having an inner ring provided with inner teeth,
a plurality of sliders each provided with outer teeth,
an expansion and retraction mechanism, and
a sliding groove plate arranged coaxially with the ratchet and rotatable with respect to the ratchet, wherein the expansion and retraction mechanism is configured to control the plurality of sliders to move radially along the sliding groove plate and further allow the outer teeth to engage with or disengage from the inner teeth, and the expansion and retraction mechanism is configured to lock or unlock the plurality of sliders, and the ratchet is provided with n inner teeth;

wherein the plurality of sliders forms m slider groups, which comprise one base slider group and m−1 deflecting slider groups, and the outer teeth of each of the deflecting slider groups have an angular deflection about a central shaft of the ratchet with respect to the outer teeth of the base slider group, and the angular deflection is $(Z+k/m)360/n$ degrees, where Z, m, n and k are all integers, and $1 \leq k \leq m-1$, and k is different for each of the deflecting slider groups in calculating the angular deflection; and wherein the expansion and retraction mechanism is configured to simultaneously push the plurality of sliders to extend in radial directions, which allows the outer teeth of the plurality of sliders to abut against or be engaged with the inner teeth and allows the plurality of sliders to be locked.

2. A seat, comprising a seat back, a seat basin and an angle adjusting device configured to adjust the relative angle between the seat back and the seat basin, wherein the angle adjusting device is the angle adjusting device according to claim 1.

3. The angle adjusting device according to claim 1, wherein the number of the sliders of the base slider group is equal to the number of the sliders of each of the deflecting slider groups, and the slider groups are arranged alternately in the circumferential direction, and the circumferentially adjacent sliders belong to different slider groups.

4. A seat, comprising a seat back, a seat basin and an angle adjusting device configured to adjust the relative angle between the seat back and the seat basin, wherein the angle adjusting device is the angle adjusting device according to claim 3.

5. The angle adjusting device according to claim 3, wherein in the case that the number of the slider groups $m \geq 5$, the outer teeth of two circumferentially adjacent slider groups have an adjacent angular deflection about the central axis of the ratchet, and the adjacent angular deflection is $(Z_1+k/m)360/n$ degrees, where $Z_1$ is an integer, m is the number of the slider groups, n is the number of inner teeth, and m, n and k are all integers, and $2 \leq k \leq m-2$.

6. A seat, comprising a seat back, a seat basin and an angle adjusting device configured to adjust the relative angle between the seat back and the seat basin, wherein the angle adjusting device is the angle adjusting device according to claim 5.

7. The angle adjusting device according to claim 1, wherein in the case that the number of the slider groups $m \geq 5$, the outer teeth of two circumferentially adjacent slider groups have an adjacent angular deflection about the central axis of the ratchet, and the adjacent angular deflection is $(Z_1+k/m)360/n$ degrees, where $Z_1$ is an integer, m is the number of the slider groups, n is the number of inner teeth, and m, n and k are all integers, and $2 \leq k \leq m-2$.

8. A seat, comprising a seat back, a seat basin and an angle adjusting device configured to adjust the relative angle between the seat back and the seat basin, wherein the angle adjusting device is the angle adjusting device according to claim 7.

9. The angle adjusting device according to claim 7, wherein in the case that $m \geq 5$, the adjacent angular deflection of the outer teeth of the two circumferentially adjacent slider groups is $(Z_1+k/m)360/n$ degrees, wherein $Z_1$ is an integer, m is the number of the slider groups, n is the number of the inner teeth, and m and n are all integers, and k is equal to 2 or 3; and/or, the outer teeth of two circumferentially alternate slider groups have an alternate angular deflection about the central axis, and the alternate angular deflection is $(Z_2+k/m)360/n$, $Z_2$ is an integer, m is the number of the slider groups, n is the number of the inner teeth, m and n are all integers, and k=1 or 2.

10. The angle adjusting device according to claim 9, wherein each of the slider groups comprises a sliders, and the two circumferentially adjacent sliders are spaced apart in the circumferential direction by an angle ranging from $360/ma-10$ degrees to $360/ma+10$ degrees.

11. The angle adjusting device according to claim 10, wherein in the case that the number of the slider groups m=2, each of the slider groups comprises two sliders; and in the case that the number of the slider groups m=3, each of the slider groups comprises two or three sliders; and in the case that $m \geq 4$, each of the slider groups comprises one slider.

12. The angle adjusting device according to claim 11, wherein the contact strength between the inner teeth and the outer teeth is greater than the contact strength between a plurality of radial sliding grooves of the sliding groove plate and the slider.

13. The angle adjusting device according to claim 1, wherein the expansion and retraction mechanism comprises:
a flange provided on the sliding groove plate;
a plurality of wedges each arranged radially between the flange and a corresponding slider, and a plurality of elastic members each arranged between the sliding groove plate and a corresponding wedge, and
an unlocking member,
wherein the plurality of elastic members is configured to move the plurality of wedges in directions for pushing the plurality of sliders radially outwards; the plurality of wedges and the plurality of sliders have one-to-one correspondence, the plurality of wedges abut against the flange in a circumferential direction via the plurality of elastic members, and the plurality of wedges and the plurality of elastic members have one-to-one correspondence;
wherein contact surfaces of the plurality of wedges in contact with the plurality of sliders and contact surface of the plurality of wedges in contact with the plurality of elastic members are both self-locking surfaces,
wherein during the process of a contact state of the outer teeth of the plurality of sliders and the inner teeth of the ratchet switching from an opposed state to a full engagement state, the pushing effect of the plurality of elastic members allows the self-locking surfaces to be in a self-locking state, and in the case that the plurality of wedges is moved in directions against elastic forces of the plurality of elastic members, the plurality of wedges allows the plurality of sliders to retract radially; and
wherein the unlocking member is configured to push the plurality of wedges to release self-locking and drive the plurality of sliders to retract radially and further separate the inner teeth from the outer teeth.

14. A seat, comprising a seat back, a seat basin and an angle adjusting device configured to adjust the relative angle between the seat back and the seat basin, wherein the angle adjusting device is the angle adjusting device according to claim 13.

15. The angle adjusting device according to claim 13, wherein in the case that the number of the slider groups m≥5, the outer teeth of two circumferentially adjacent slider groups have an adjacent angular deflection about the central axis of the ratchet, and the adjacent angular deflection is $(Z_1+k/m)360/n$ degrees, where $Z_1$ is an integer, m is the number of the slider groups, n is the number of inner teeth, and m, n and k are all integers, and 2≤k≤m−2.

16. A seat, comprising a seat back, a seat basin and an angle adjusting device configured to adjust the relative angle between the seat back and the seat basin, wherein the angle adjusting device is the angle adjusting device according to claim 15.

17. The angle adjusting device according to claim 13, wherein
each of the plurality of sliders is provided with an axial slider boss, each of the plurality of wedges is provided with an axial wedge boss;
the unlocking member is coaxially arranged with the sliding groove plate, the unlocking member is provided with a plurality of slider control grooves and a plurality of wedge control grooves, each of the plurality of slider control grooves is in cooperation with the slider boss, each of the plurality of wedge control grooves is in cooperation with the wedge boss, and the rotation of the unlocking member in an unlocking direction allows the plurality of wedges to move in directions against the elastic forces of the plurality of elastic members and the plurality of sliders to retract radially.

18. A seat, comprising a seat back, a seat basin and an angle adjusting device configured to adjust the relative angle between the seat back and the seat basin, wherein the angle adjusting device is the angle adjusting device according to claim 17.

19. The angle adjusting device according to claim 17, wherein in the case that the number of the slider groups m≥5, the outer teeth of two circumferentially adjacent slider groups have an adjacent angular deflection about the central axis of the ratchet, and the adjacent angular deflection is $(Z_1+k/m)360/n$ degrees, where $Z_1$ is an integer, m is the number of the slider groups, n is the number of inner teeth, and m, n and k are all integers, and 2≤k≤m−2.

20. A seat, comprising a seat back, a seat basin and an angle adjusting device configured to adjust the relative angle between the seat back and the seat basin, wherein the angle adjusting device is the angle adjusting device according to claim 19.

* * * * *

UNITED STATES PATENT AND TRADEMARK OFFICE
CERTIFICATE OF CORRECTION

PATENT NO. : 10,358,055 B2
APPLICATION NO. : 15/663372
DATED : July 23, 2019
INVENTOR(S) : Huang et al.

Page 1 of 1

It is certified that error appears in the above-identified patent and that said Letters Patent is hereby corrected as shown below:

On the Title Page

Item (30), Foreign Application Priority Data:

Line 1, "Sep. 9, 2016 (CN) 2016 1 0812769" should read -- Sep. 9, 2016 (CN) 201610812769.2 --
Line 2, "Sep. 9, 2016 (CN) 2016 2 1047353 U" should read -- Sep. 9, 2016 (CN) 201621047353.8 --

Signed and Sealed this
Thirty-first Day of December, 2019

Andrei Iancu
*Director of the United States Patent and Trademark Office*